United States Patent
Kruijt

(10) Patent No.: US 7,510,276 B2
(45) Date of Patent: Mar. 31, 2009

(54) TEMPERATURE CONTROL SYSTEM FOR A SHEET SUPPORT PLATE OF A PRINTER

(75) Inventor: Pieter G. M. Kruijt, Eindhoven (NL)

(73) Assignee: OCE-Technologies B.V., Venlo (NL)

( * ) Notice: Subject to any disclaimer, the term of this patent is extended or adjusted under 35 U.S.C. 154(b) by 429 days.

(21) Appl. No.: 11/318,447

(22) Filed: Dec. 28, 2005

(65) Prior Publication Data

US 2006/0139390 A1    Jun. 29, 2006

(30) Foreign Application Priority Data

Dec. 29, 2004  (EP) .................................. 04107043

(51) Int. Cl.
- *B41J 2/01* (2006.01)
- *B41J 29/38* (2006.01)
- *G03G 15/20* (2006.01)
- *B23K 13/08* (2006.01)

(52) U.S. Cl. .................. 347/101; 347/17; 347/102; 347/104; 399/69; 399/70; 219/482

(58) Field of Classification Search ............ 347/17, 347/88, 99, 101, 102, 104, 16, 13; 101/488; 399/88, 169, 69, 70; 713/340; 346/134; 165/168; 425/407; 264/40.1; 34/638; 219/482

See application file for complete search history.

(56) References Cited

U.S. PATENT DOCUMENTS

| | | | | |
|---|---|---|---|---|
| 3,235,973 | A * | 2/1966 | Smith, Jr. ..................... 34/638 |
| 3,621,909 | A * | 11/1971 | Smith, Jr. ..................... 165/168 |
| 4,269,586 | A * | 5/1981 | Ronayne ..................... 425/407 |
| 5,124,728 | A * | 6/1992 | Denda ......................... 346/134 |
| 5,995,397 | A | 11/1999 | Kim |
| 6,178,299 | B1 * | 1/2001 | Kim ............................ 399/88 |
| 6,196,672 | B1 * | 3/2001 | Ito et al. ....................... 347/88 |
| 6,309,060 | B1 * | 10/2001 | Timmermans-Wang et al. ................ 347/88 |
| 6,526,516 | B1 * | 2/2003 | Ishikawa et al. ............ 713/340 |
| 6,807,386 | B2 * | 10/2004 | Yasui et al. ................... 399/69 |
| 6,959,973 | B2 * | 11/2005 | Kubota ........................ 347/13 |
| 7,002,112 | B2 * | 2/2006 | Kishi et al. ................. 219/482 |
| 7,239,821 | B2 * | 7/2007 | Matsusaka et al. ............ 399/69 |
| 7,247,816 | B2 * | 7/2007 | Kishi et al. ................. 219/216 |
| 7,257,341 | B2 * | 8/2007 | Hanamoto et al. ............ 399/67 |
| 7,260,337 | B2 * | 8/2007 | Koyama et al. ............... 399/67 |
| 2002/0071016 | A1 * | 6/2002 | Wotton et al. ................ 347/102 |
| 2004/0017435 | A1 | 1/2004 | Kubota |

(Continued)

FOREIGN PATENT DOCUMENTS

EP    0 924 593 A2    6/1999

(Continued)

*Primary Examiner*—Stephen D Meier
*Assistant Examiner*—Rene Garcia, Jr.
(74) *Attorney, Agent, or Firm*—Birch, Stewart, Kolasch & Birch, LLP

(57) ABSTRACT

A temperature control system for a sheet support plate of a printer which has at least two power supplies for powering different sub-systems of the printer, the temperature control system containing at least one heater and a power management system adapted to use spare power capacities of the two power supplies by controlling the power supplied to said at least one heater in accordance with the load conditions of said power supplies.

10 Claims, 2 Drawing Sheets

U.S. PATENT DOCUMENTS

| | | |
|---|---|---|
| 2004/0042825 A1 | 3/2004 | Yasui et al. |
| 2006/0043624 A1* | 3/2006 | Downing .................. 264/40.1 |
| 2006/0071996 A1* | 4/2006 | Kruijt ......................... 347/104 |
| 2006/0071997 A1* | 4/2006 | Kruijt ......................... 347/104 |
| 2006/0139390 A1* | 6/2006 | Kruijt ........................... 347/17 |

FOREIGN PATENT DOCUMENTS

EP      0 987 605 A2    3/2000

* cited by examiner

TEMPERATURE CONTROL SYSTEM FOR A SHEET SUPPORT PLATE OF A PRINTER

CROSS-REFERENCE TO A RELATED APPLICATION

This application claims priority to European Patent Application No. 04107043.4 filed on Dec. 29, 2004 in Europe, the entire contents of which is hereby incorporated by reference in its entirety.

BACKGROUND OF THE INVENTION

The present invention relates to a temperature control system for a sheet support plate of a printer which has at least two power supplies for powering different sub-systems of the printer, the temperature control system including at least one heater.

In the copying and printing industry, a temperature controlled sheet support plate is frequently used for supporting an image receiving sheet and at the same time controlling the temperature thereof. For example, in a hot melt ink jet printer, a sheet, e.g. a sheet of paper, is advanced over the sheet support plate while the image is being printed. At room temperature, the hot melt ink is solid, and it is therefore necessary that the ink is heated in the printer above its melting point, before it can be jetted onto the paper. The ink droplets that have been jetted onto the paper tend to spread-out more or less before the ink solidifies. In order to obtain a suitable and constant amount of spreading of the ink droplets, the temperature of the sheet support plate and hence the temperature of the paper should be controlled such that the ink cools down at an appropriate rate.

In an initial phase of the print process, when a new sheet has been supplied, it is generally desirable to heat the sheet and to keep it at a suitable operating temperature. Thus, the sheet support plate should be heated by a heater. However, in the further course of the print process, it is necessary to dissipate the heat of the ink that solidifies on the paper. To that end, a temperature control fluid, e.g. a liquid, may be passed through a cavity in the plate in order to control the temperature of the plate.

For reasons of power consumption, it is required that the printer enters into a so-called sleep mode, when the printer is not operating for a certain amount of time, and in the sleep mode, among others, the heating system for the sheet support plate is switched off. Thus, when the printer is switched on or is switched from the sleep mode into the operating mode again, it will take a certain amount of time for the sheet support plate to be heated to its operating temperature. In order to shorten this warming-up process of the sheet support plate, a considerable amount of heating power is required.

SUMMARY OF THE INVENTION

The present invention provides a temperature control system by which the sheet support plate can be brought to its operating temperature in an efficient manner. According to the present invention, this is achieved by a temperature control system of the type indicated above, which further comprises a power management system adapted to use spare power capacities of at least two power supplies by controlling the power supplied to said at least one heater in accordance with the load conditions of said power supplies.

In a conventional temperature control system for a sheet support plate, there may be provided an extra power supply for the heater of the temperature control system, or a power supply that is dedicated to a sub-system of the printer may be dimensioned so as to provide the power for the heater needed during a warming-up process, in addition to the power required by the sub-system. After the warming-up process, however, the temperature control system requires much less power. Thus, the extra power supply or the capacity of the existing power supply will be utilized mainly during the warming-up process and will be idle most of the time. Thus, the power capacity is not used efficiently. Moreover, high power consumption peaks that stress the power net of the printer may occur during the warming-up process.

According to the present invention, an extra power supply can be dispensed with, and the heater of the temperature control system can use the spare power capacities of the power supplies dedicated to other devices or sub-systems of the printer. Because the power management system shares two or more power supplies, the required heating power for the warming-up process can be provided very efficiently. Thus, the power capacities of the present power supplies are used very efficiently. Moreover, the load of the power supplies due to the power consumption of the other sub-systems and of the heater can be balanced. By this load-balancing, power consumption peaks can be avoided and the dimensions of the power supplies may be reduced.

Preferably, at least one heater is adapted to be operated on at least two different levels of power consumption. For example, a heater may be operated at different input voltages, or the current supplied to the heater may be limited in accordance with the load conditions of the power supply. Preferably, the input voltage or the current intensity is continuously adjustable.

In a preferred embodiment, the temperature control system comprises at least two heaters adapted to be powered by different power supplies. For example, two heaters may have different electrical resistance, so that different heating powers can be achieved at the same input voltage, or the heaters may be adapted to different input voltages. Advantageously, the power management system is enabled to operate the heaters simultaneously. Thereby, a maximum heating power can be achieved.

In a preferred embodiment, the at least two power supplies are dedicated to different sub-systems having varying power consumption. For example, in a hot melt ink jet printer, a first power supply may be dedicated to the movement of a printhead carriage, and a second power supply may be dedicated to heating the printheads to their operation temperature. These two power supplies may have different output voltages as, for example, the mentioned devices of the printer may require different input voltages.

In a particularly preferred embodiment, the sheet support plate has at least one cavity, and the temperature control system further comprises a circulation system for circulating a temperature control fluid through said cavity, the at least one heater being arranged to heat the temperature control fluid. Then, the temperature of the temperature control fluid may also be cooled to control its temperature.

BRIEF DESCRIPTION OF THE DRAWINGS

A preferred embodiment of the present invention will now be described in conjunction with the drawings in which.

DETAILED DESCRIPTION OF THE INVENTION

Figure 1:
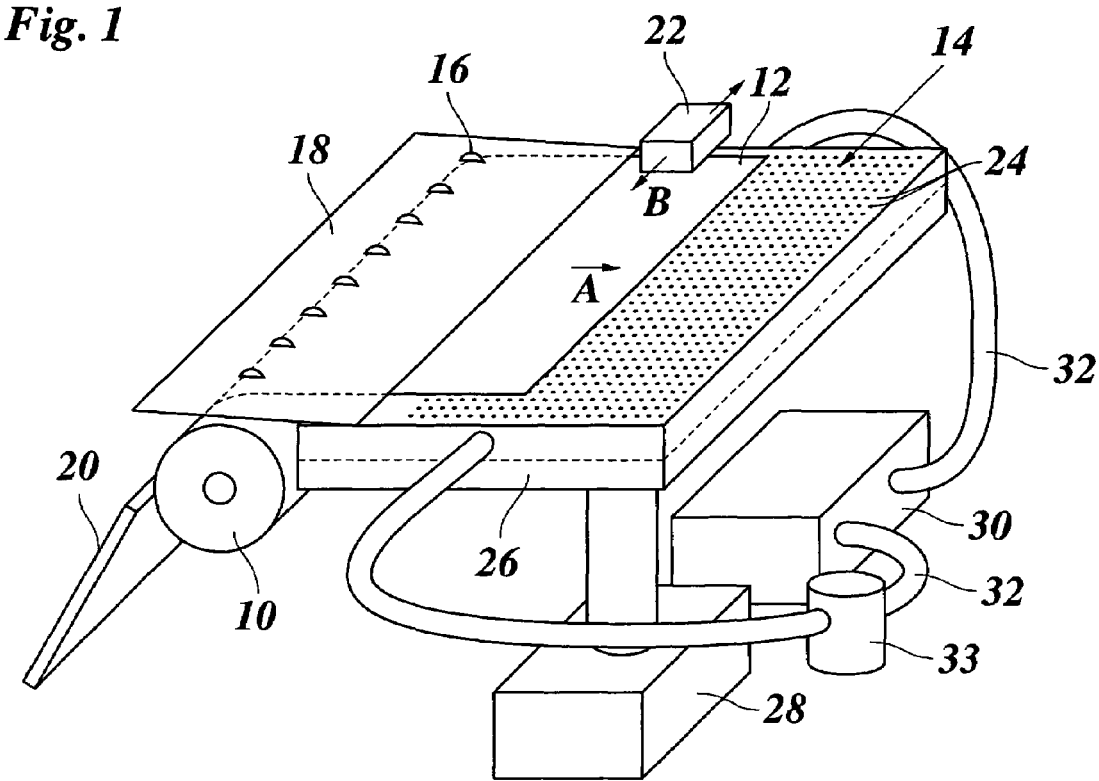
FIG. 1 is a schematic perspective view of a hot melt ink jet printer.

As is shown in FIG. 1, a hot melt ink jet printer comprises a platen 10 which is intermittently driven to rotate in order to advance a sheet 12, e.g. a sheet of paper, in a direction indicated by an arrow A over the top surface of a sheet support plate 14. A number of transport rollers 16 are rotatably supported in a cover plate 18 and form a transport nip with the platen 10, so that the sheet 12, which is supplied from a reel (not shown) via a guide plate 20, is paid out through a gap formed between an edge of the cover plate 18 and the surface of the sheet support plate 14.

A carriage 22 which includes a number of ink jet printheads (not shown) is mounted above the sheet support plate 14 so as to reciprocate in the direction of arrows B across the sheet 12. In each pass of the carriage 22, a number of pixel lines are printed on the sheet 12 by means of the printheads which eject droplets of hot melt ink onto the sheet in accordance with image information supplied to the printheads. For the sake of simplicity, guide and drive means for the carriage 22, ink supply lines and data supply lines for the printheads, and the like, have not been shown in the drawing.

The top surface of the sheet support plate 14 has a regular pattern of suction holes 24 which pass through the plate and open into a suction chamber 26 that is formed in the lower part of the plate 14. The suction chamber is connected to a blower 28 which creates a subatmospheric pressure in the suction chamber, so that air is drawn-in through the suction holes 24. As a result, the sheet 12 is drawn against the flat surface of the support plate 14 and is thereby held in a flat condition, especially in the area which is scanned by the carriage 22, so that a uniform distance between the nozzles of the printheads and the surface of the sheet 12 is established over the whole width of the sheet and a high print quality can be achieved.

The droplets of molten ink that are jetted out from the nozzles of the printheads have a temperature of 100° C. or more and cool down and solidify after they have been deposited on the sheet 12. Thus, while the image is being printed, the heat of the ink must be dissipated with a sufficient rate. On the other hand, in the initial phase of the image forming process, the temperature of the sheet 12 should not be too low, because otherwise the ink droplets on the sheet 12 would be cooled too rapidly and would not have time enough to spread-out. For this reason, the temperature of the sheet 12 is controlled via the sheet support plate 14 by means of a temperature control system 30 which circulates a temperature control fluid, preferably a liquid, through the plate 14. The temperature control system includes a circulation system with tubes 32 that are connected to opposite ends of the plate 14. One of the tubes passes through an expansion vessel 33 containing a gas buffer for absorbing temperature-dependent changes in the volume of the liquid.

Figure 2:
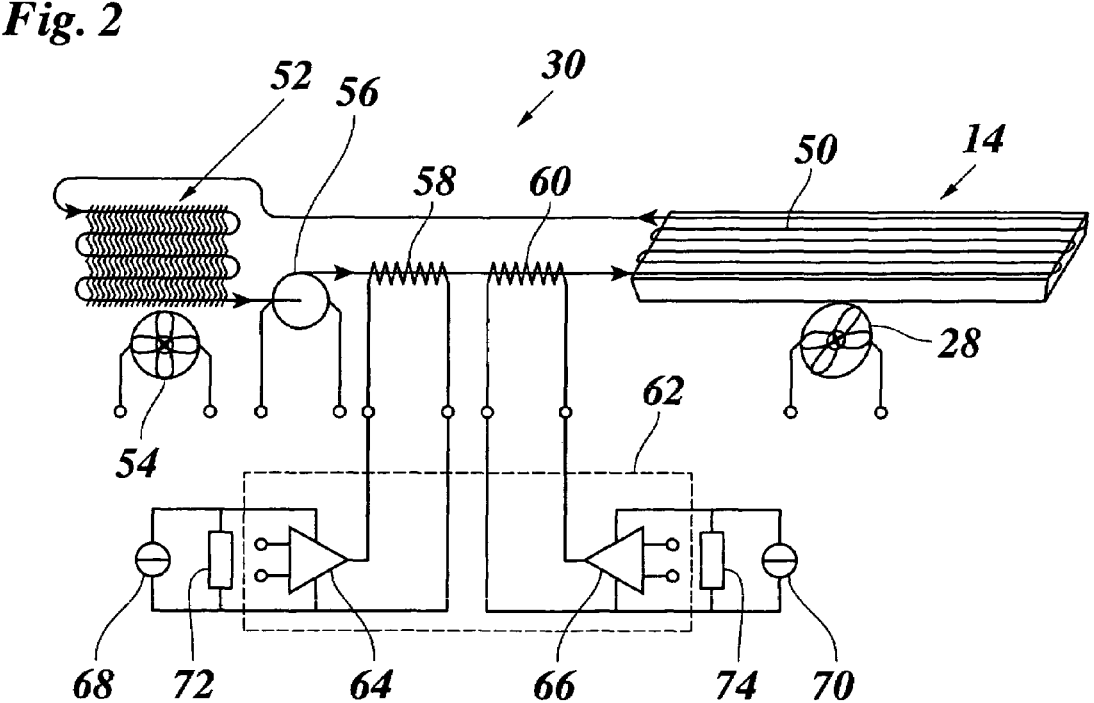
FIG. 2 is a schematic diagram of a temperature control system of the printer.

Details of the temperature control system 30 will now be described in conjunction with FIG. 2. In FIG. 2, the sheet support plate 14 is schematically shown. A cavity 50 of the circulation system forms a heat exchanger below the top surface of the sheet support plate 14. The blower 28 is also shown symbolically. The temperature control system 30 comprises a radiator 52 with a cooling fan 54 that forms a heat sink of the circulation system. The circulation system further comprises a pump 56 or other displacement means for circulating the fluid through the cavity 50 of the sheet support plate 14. The circulation system further comprises a first heater 58 and a second heater 60 which are controlled by a power management system 62 that is symbolized by a first driver 64 and a second driver 66. For example, the drivers 64, 66 may be current limiters.

As will be readily understood, the temperature control system 30 also includes temperature sensors and control means for the cooling fan and the like for controlling the temperature of the fluid.

The first driver 64 connects the first heater 58 to a 48 V power supply 68, while the second driver 66 connects the second heater 60 to a 24 V power supply 70.

The 48 V power supply 68 is mainly dedicated to a heater for the printheads on the carriage 22, the heater being symbolically shown as an electrical load 72. The 24 V power supply 70, however, is mainly dedicated to operate the drive means of the carriage 22 which are symbolically shown as an electrical load 74. For the sake of simplicity, control means for the heater of the printheads and for the drive means of the carriage 22 have not been shown in the drawing.

Through the drivers 64, 66, the power management system 62 can operate each of the heaters 58, 60 at varying input voltages or varying current intensities, and, thus, varying levels of power consumption.

Since the electrical load 72 of the heater for the printheads and the electrical load 74 of the drive means of the carriage 22 each have a varying power consumption depending on their momentary activity, spare power capacities of the power supplies 68 and 70 are available and are used for the heaters 58 and 60, as will be now described in detail.

When the printer has been in an off-state or in a low power mode or sleep mode, the sheet support plate 14 has to be heated to its operation temperature of, for example, 32° C. in a warming-up process, in order to start printing again. This requires, for example, a power of 200 W. During the start-up of the printer, the 24 V power supply 70 is barely used, since it is dedicated to powering the drive means for the carriage 22 when printing. Therefore, the spare power capacities of the 24 V power supply 70 will be allotted to the heater 60 by the power management system 62.

The 48 V power supply 68 is needed to heat the printheads on the carriage 22 to their operation temperature during the start-up of the printer. Therefore, the 48 V power supply 68 is already used almost to its limit during the warming-up process. However, when the printheads have reached their operating temperature, the sheet support plate 14 still needs to be warmed. At this time, less power is needed to heat the printheads. Therefore, the power management system 62 will allot spare power capacities of the 48 V power supply 68 to the first heater 58. During printing, though the 24 V power supply 70 is needed for the drive means of the carriage 22, spare power capacities of the 24 V power supply 70 may still be allotted to the second heater 60.

Due to the power management system, a short warm-up time of the printer can be realized without having to increase the peak performance of the power supplies. Since spare capacities of both power supplies 68, 70 can be allotted to the heaters 58, 60 of the temperature control system 30, the power that is momentarily unused by other devices of the printer is used in a highly efficient manner for the temperature control system.

Figure 3:
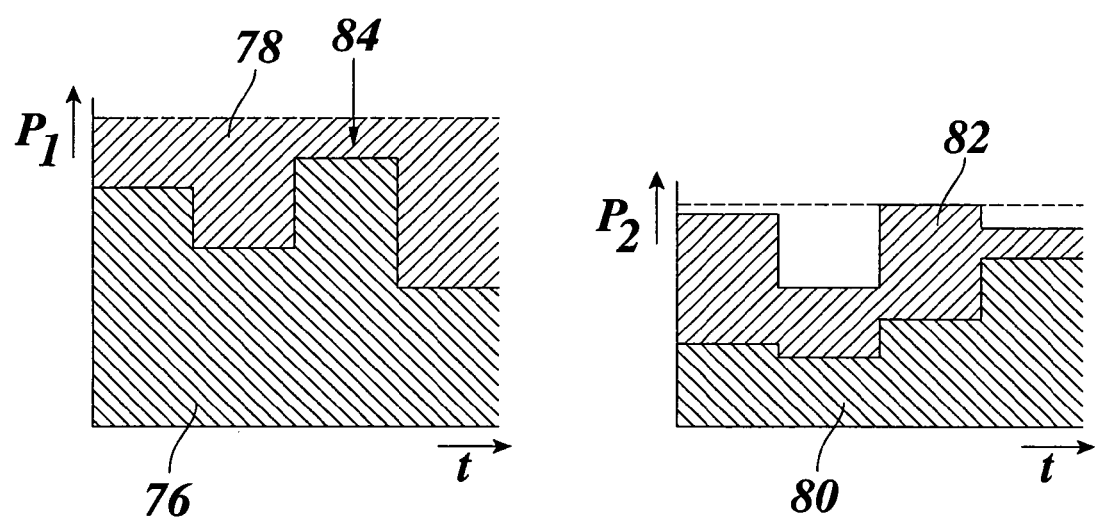
FIG. 3 shows diagrams of power consumption during a warming-up process of the printer.

As an example, FIG. 3 schematically shows power diagrams for the power supplies 68, 70. The power $P_1$ of the 48 V power supply 68 and the power $P_2$ Of the 24 V power supply 70 are separately shown in relation to the time t. Power limits of the power supplies 68, 70 are indicated by dashed lines.

The power $P_1$ is the sum of the power 76 used by the electrical load 72 of the heater for the printheads and the power 78 that is allotted by the power management system 62 to the first heater 58. The power $P_2$ is the sum of the power 80 required by the drive means of the carriage 22, i.e. the electrical load 74, and the power 82 that is allotted to the second heater 60. In the example shown, the individual powers 76, 78, 80, and 82 vary over the time t, while the sum of the powers 78 and 82 that are used for the heaters 58 and 60 is approximately constant. Yet, there are situations where almost the full power of a power supply is provided to the device to which the power supply is dedicated. An arrow 84 indicates, for example, a situation where the power $P_1$ is almost used up by the electrical load 72 of the heater for the printheads. At this point, the power limits of $P_1$ and $P_2$ are reached, and the sum of the powers 78 and 82 is less than under the other conditions. However, the momentary electrical loads 72, 74 of the heater for the printheads and the drive means for the carriage 22, and the momentary electrical loads of the heaters 58, 60 are balanced so that the power limits of the power supplies 68, 70 are not exceeded.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bound are therefore intended to be embraced by the appended claims.

The invention claimed is:

1. A temperature control system for a sheet support plate of a printer which has at least two power supplies for powering different sub-systems of the printer, the temperature control system comprising at least one heater, wherein a power management system is adapted to use the spare power capacities of the at least two power supplies by controlling the power supplied to said at least one heater in accordance with the load conditions of the power supplies.

2. The temperature control system according to claim 1, wherein the at least one heater is adapted to be operated on at least two different levels of power consumption.

3. The temperature control system according to claim 1, wherein the temperature control system comprises at least two heaters, adapted to be powered by different power supplies.

4. The temperature control system according to claim 2, wherein the temperature control system comprises at least two heaters, adapted to be powered by different power supplies.

5. The temperature control system according to claim 3, wherein the power management system is enabled to operate the heaters simultaneously.

6. The temperature control system according to claim 1, wherein the at least two power supplies have different output voltages.

7. The temperature control system of claim 1, wherein the sheet support plate has at least one cavity, and wherein the temperature control system further comprises a circulation system for circulating a temperature control fluid through said cavity, the at least one heater being arranged to heat the temperature control fluid.

8. The temperature control system of claim 1, wherein one of the power supplies is adapted to power a drive system for moving a carriage of the printer.

9. A hot melt ink jet printer comprising the temperature control system of claim 1.

10. The hot melt ink jet printer according to claim 9, wherein one of the power supplies is adapted to provide power for heating the hot melt ink.

\* \* \* \* \*